US012783394B2

(12) United States Patent
Brumer et al.

(10) Patent No.: US 12,783,394 B2
(45) Date of Patent: Nov. 3, 2026

(54) SYSTEMS AND METHODS FOR DYNAMIC MAPPING AND REROUTING OF A NON-OPTIMIZED BINARY TO AN OPTIMIZED BINARY

(71) Applicant: Microsoft Technology Licensing, LLC, Redmond, WA (US)

(72) Inventors: Eric Brumer, Woodinville, WA (US); Shayne Daniel Hiet-Block, White Rock (CA); Austen Isaac Ott, Redmond, WA (US); Terry Jack Mahaffey, Apex, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 116 days.

(21) Appl. No.: 18/680,381

(22) Filed: May 31, 2024

(65) Prior Publication Data

US 2025/0342109 A1 Nov. 6, 2025

Related U.S. Application Data

(60) Provisional application No. 63/641,802, filed on May 2, 2024.

(51) Int. Cl.

| | |
|---|---|
| ***G06F 8/41*** | (2018.01) |
| ***G06F 8/52*** | (2018.01) |
| ***G06F 8/53*** | (2018.01) |
| ***G06F 9/45*** | (2006.01) |
| ***G06F 9/46*** | (2006.01) |

(Continued)

(52) U.S. Cl.
CPC ............ *G06F 11/3696* (2013.01); *G06F 8/41* (2013.01); *G06F 8/52* (2013.01)

(58) Field of Classification Search
CPC .... G06F 8/41; G06F 11/3696; G06F 11/3624; G06F 8/52; G06F 8/433; G06F 11/3628; G06F 11/3698; G06F 11/3644; G06F 8/73; G06F 8/425; G06F 8/44; G06F 8/20;

(Continued)

(56) References Cited

U.S. PATENT DOCUMENTS 9,207,919 B2 * 12/2015 Diamos ............... G06F 9/45516
9,858,058 B2 * 1/2018 Gschwind ............ G06F 8/4435

(Continued)

FOREIGN PATENT DOCUMENTS

WO 2024069730 A1 4/2024

OTHER PUBLICATIONS

Pizzolotto et al., Identifying Compiler and Optimization Level in Binary Code From Multiple Architectures, 15 pages (Year: 2021).*

(Continued)

*Primary Examiner* — Thuy Dao
(74) *Attorney, Agent, or Firm* — Workman Nydegger

(57) ABSTRACT

Systems, methods, and devices are provided for dynamically mapping and rerouting a non-optimized binary to an optimized binary. Embodiments identify a position-independent portion within a non-optimized binary and receive metadata associated with an optimized binary. Further, embodiments identify a location identifier within the optimized binary from the metadata and generate a delta value between the position-independent portion and the location identifier. Embodiments also update the position-independent portion with the delta value.

20 Claims, 10 Drawing Sheets

(51) Int. Cl.
*G06F 11/362* (2025.01)
*G06F 11/3668* (2025.01)

(58) Field of Classification Search
CPC .... G06F 9/3004; G06F 9/30087; G06F 9/466; G06F 9/467; G06F 9/544; G08B 21/182
See application file for complete search history.

(56) References Cited

U.S. PATENT DOCUMENTS

| | | | |
|---|---|---|---|
| 10,628,286 | B1 | 4/2020 | Iyer |
| 11,886,848 | B2 * | 1/2024 | Koju .......................... G06F 8/52 |
| 12,223,436 | B2 * | 2/2025 | Ross ...................... G06N 5/022 |
| 2009/0064117 | A1 | 3/2009 | Bashkansky et al. |
| 2014/0289707 | A1 | 9/2014 | Guan |
| 2014/0325488 | A1 | 10/2014 | Moench |
| 2015/0317139 | A1 | 11/2015 | Tallam |
| 2015/0347274 | A1 | 12/2015 | Taylor |
| 2020/0125475 | A1 | 4/2020 | Iyer |
| 2022/0043650 | A1 | 2/2022 | Jain |
| 2025/0342110 | A1 | 11/2025 | Brumer |

OTHER PUBLICATIONS

U.S. Appl. No. 63/641,802, filed May 2, 2024.
U.S. Appl. No. 63/641,766, filed May 2, 2024.
U.S. Appl. No. 18/680,402, filed May 31, 2024.
Extended European search report received in European Application No. 25171929.0, (MS# 501484-EP01), mailed on Oct. 6, 2025, 11 pages.
Non-Final Office Action mailed on Apr. 7, 2026, in U.S. Appl. No. 18/680,402 (MS# 501484-US02), 20 Pages.
Yin, et al., "Debugopt: Debugging Fully Optimized Natively Compiled Programs Using Multistage Instrumentation", Science of Computer Programming, vol. 169, Oct. 9, 2018, pp. 18-32.
Final Office Action mailed on Sep. 11, 2026, in U.S. Appl. No. 18/680,402, 17 Pages.

* cited by examiner

200

200

300

SYSTEMS AND METHODS FOR DYNAMIC MAPPING AND REROUTING OF A NON-OPTIMIZED BINARY TO AN OPTIMIZED BINARY

CROSS-REFERENCE TO RELATED APPLICATION

This application claims the benefit and priority of U.S. Provisional Patent Application Ser. No. 63/641,802 filed on 2 May 2024, entitled "SYSTEMS AND METHODS FOR DYNAMICALLY MAPPING AND REROUTING OF A NON-OPTIMIZED BINARY TO AN OPTIMIZED BINARY," and which application is expressly incorporated herein by reference in its entirety.

BACKGROUND

During the development of a software program, it is common for a software developer to perform debugging processes on the underlying software code. In many instances, the software engineer will perform debugging directly on non-optimized versions of the code, also referred to herein as "debug" builds. However, some developers, such as game developers, find non-optimized builds to be difficult or impractical to use. In particular, the code is often executed too slowly in a non-optimized build, resulting in low framerates that make a game unplayable. Accordingly, many developers (especially game developers) often resort to building optimizing code, known as the "release" builds which are smaller and typically more effective to utilize during debugging.

Unfortunately, in some instances, the release version or optimized versions of the code can still be somewhat difficult to utilize during certain debugging processes. More specifically, local variable inspection may not work, debugger stepping behavior can sometimes be erratic, and developers may not understand how to best debug certain portions of the code when relevant context and information is stripped away as a result of the compiler optimizations used to generate the optimized version of the code.

For example, a developer may run optimized code with breakpoints that are set at different portions of the code, such as for a recited function, which can trigger the debugger to present relevant information regarding execution of the function. However, when the code is optimized, some of the relevant context information that the developer may want to see or that may be required for a debugging process, may be omitted from the optimized build. In these instances, the developer may need to stop the debugging process to modify the source code to include directives to disable optimizations for the relevant functions. Then, after making these changes, the modified version of the partially optimized program will have to be recompiled and the debugger can be restarted. Notably, the time required to rebuild and restart the debugger is undesirable and can make the debugging process somewhat inefficient.

The subject matter claimed herein is not limited to embodiments that solve any disadvantages or that operate only in environments such as those described. Instead, this background is only provided to illustrate one example technology area where some embodiments described herein may be practiced.

SUMMARY

The present disclosure relates to systems, methods, and devices that update mappings of a non-optimized binary to an optimized binary.

In some aspects, the techniques described herein relate to a computer-implemented method for updating mappings of a non-optimized binary to an optimized binary, including: identifying a position-independent portion within a non-optimized binary; receiving metadata associated with an optimized binary; identifying a location identifier within the optimized binary from the metadata; generating a delta value between the position-independent portion and the location identifier; and updating the position-independent portion with the delta value.

In some aspects, the techniques described herein relate to a computer system, including: a processor system; and a computer storage medium that stores computer-executable instructions that are executable by the processor system to at least: identifying a position-independent portion within a non-optimized binary; receiving metadata associated with an optimized binary; identifying a location identifier within the optimized binary from the metadata; generating a delta value between the position-independent portion and the location identifier; and updating the position-independent portion with the delta value.

In some aspects, the techniques described herein relate to a computer storage medium that stores computer-executable instructions that are executable by a processor system to updating mappings of a non-optimized binary to an optimized binary, the computer-executable instructions including instructions that are executable by the processor system to at least: identifying a position-independent portion within a non-optimized binary; receiving metadata associated with an optimized binary; identifying a location identifier within the optimized binary from the metadata; generating a delta value between the position-independent portion and the location identifier; and updating the position-independent portion with the delta value.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

Systems and methods are described and explained with additional specificity and detail through the use of the accompanying drawings, in which.

DETAILED DESCRIPTION

Figure 1:
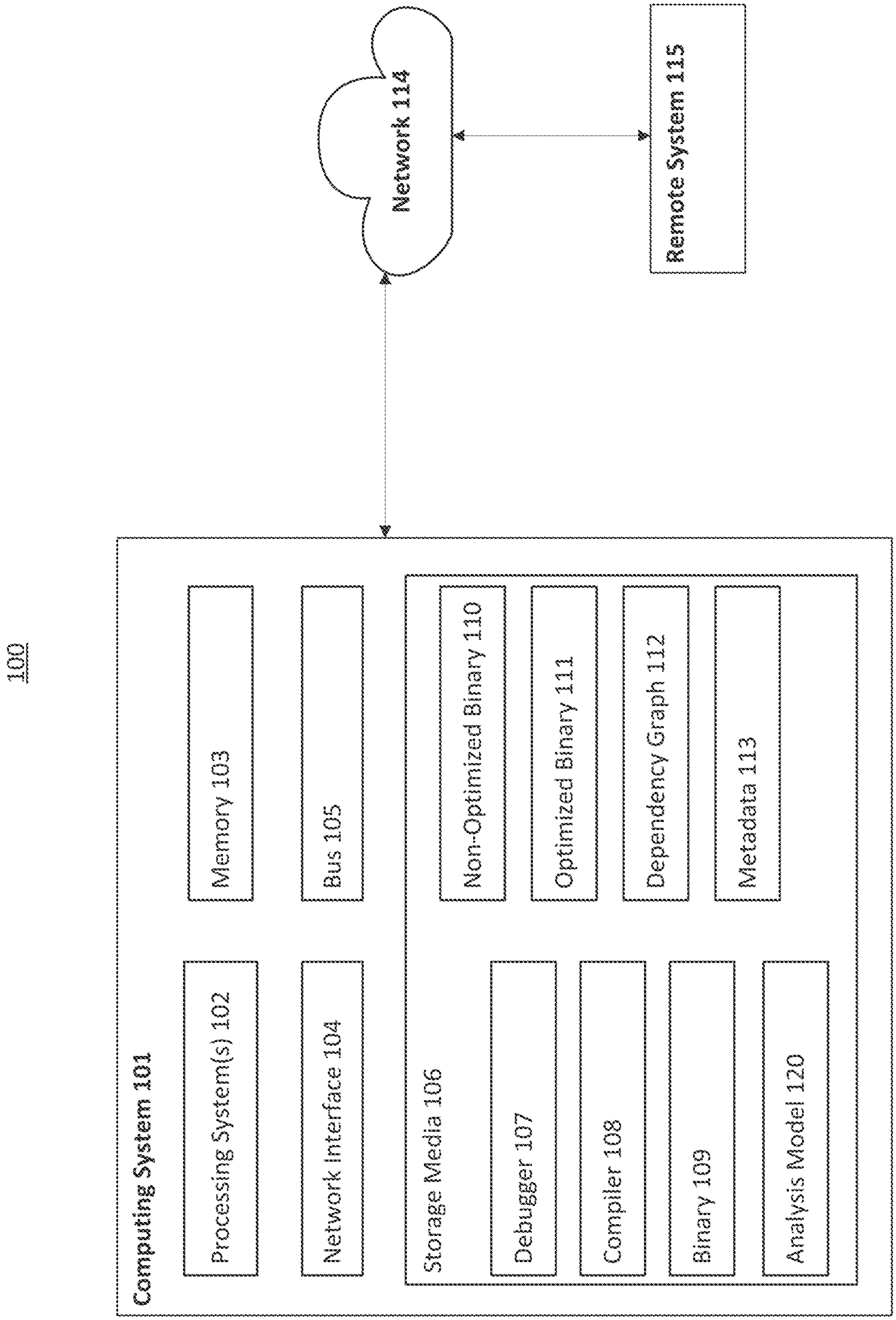
FIG. 1 illustrates an example of a computer architecture that facilitates seamless debugging while dynamically rerouting between an optimized binary and a non-optimized binary.

Disclosed embodiments include methods, systems and computer-program products that can be utilized for facilitating debugging processes and, even more particularly, for selectively utilizing both optimized builds and non-optimized builds of code during debugging.

As mentioned above, some developers perform debugging on optimized code, or release builds, rather than from the correlated non-optimized versions of the code, because execution of non-optimized code can be too slow to be useful. However, when a developer performs debugging operations from optimized versions of the code, the developer may have to modify and recompile the optimized source code every time an issue arises due to missing information in the optimized build. For instance, some issues arise due to optimizations for a particular function that is replaced or omitted in the optimized build. In such instances, the developer may need to disable optimizations for that function and rebuild the optimized code before continuing with the debugging process. This is a very inefficient process. Alternatively, the developers can do a deoptimization to avoid the rebuilding processes mentioned above. However, this may require user intervention to deoptimize a file, as well as delays experienced during the deoptimization. Additionally, the deoptimized code may not be as easily navigated within the integrated development environments as the optimized code could be navigated, leading to negative user experiences.

Many of the foregoing problems can be addressed by the disclosed embodiments in which techniques and systems are provided to selectively utilize and manage navigation between the optimized build of a binary and a behind-the-scenes non-optimized build of the same binary during debugging. In these embodiments, a developer can set breakpoints within the compiled optimized binary to reference desired information associated with the execution of particular functions in the code. Then, when the debugger hits a breakpoint for such a function, the debugger redirects the execution to the non-optimized binary where the desired information for that function can be obtained. After processing the relevant portions of the referenced function in the non-optimized binary, the execution of the debugger is then redirected back to the optimized binary. In other words, some embodiments allow for optimized code execution and non-optimized code debuggability simultaneously and seamlessly.

At least some embodiments are particularly advantageous by allowing seamless debugging using a non-optimized binary while simultaneously executing an optimized binary for high-performance execution. Additionally, some embodiments provide instantaneous switching between the non-optimized binary and the optimized binary, therefore significantly improving speed and efficiency during debugging. In other words, embodiments of the invention can facilitate instant de-optimizations for all functions. Embodiments of the invention can also be utilized to reduce requirements for user intervention while switching between optimized and non-optimized binaries during debugging, reduce overall debug-time build cost that would otherwise be required to repeatedly rebuild optimized code, and to facilitate seamless integration and navigation between the binaries within integrated development environments.

As a brief overview, embodiments of the invention include the generation or access to both an optimized binary, as well as the corresponding non-optimized binary, along with relevant metadata, and a corresponding dependency graph that can be used to facilitate cross-referencing of correlating portions of the code in the optimized and non-optimized binaries. In response to a triggering event for initiating the debugging, such as a user request, an analysis model is used to determine whether to debug the program using only the optimized binary, or alternatively, whether to selectively utilize both the non-optimized binary with the optimized binary, or to alternatively use only the non-optimized binary.

In instances where both the optimized binary and the non-optimized binary are used, the developer or debugger may add desired breakpoints to functions within the optimized binary. The debugger also adds guard breakpoints to the optimized binary based on a dependency graph for redirecting execution during the debugging processing to the correlating portions of the non-optimized binary. Then, once the debugger encounters a guard breakpoint, the debugger is redirected to a portion of the non-optimized binary that is associated with the guard breakpoint. Thereafter, when the debugger encounters a position-independent portion in the non-optimized binary, the debugger uses metadata in the non-optimized binary to update the position-independent portion with delta information that is used to redirect back to the relevant portion of the optimized binary where the triggering guard breakpoint is located. Then, after execution of the correlating portion of the non-optimized binary by the debugger, the debugger is redirected back to the guard breakpoint in the optimized binary based on the updated position-independent portion.

Turning now to the Figures, FIG. 1 illustrates an example of computer architecture 100 that facilitates the disclosed functionality for selectively utilizing both the optimized build and a correlating non-optimized build of a binary during debugging of the binary.

As shown, computer architecture 100 includes a computer system 101 comprising processor system 102 (e.g., a single processor or a plurality of processors), memory 103 (e.g., system or main memory), storage media 106 (e.g., a single computer-readable storage medium, or a plurality of computer-readable storage media), all interconnected by a bus 105. As shown, computer system 101 may also include a network interface 104 (e.g., one or more network interface cards) for interconnecting (via a network 114) to a remote system 115 (e.g., a single computer system or a plurality of computer systems).

FIG. 1 also illustrates storage media 106 of the computing system 101 as storing computer-executable instructions (e.g., a debugger 107, a compiler 108, and an analysis model 120) that are executable by a processor (e.g., processor system 102) to cause a computer system 101 to perform the functionality disclosed herein. This functionality includes compiling and/or accessing correlating optimized and non-optimized binaries which are used to generate a dependency graph 112 and metadata 113 corresponding to the referenced binaries. The functionality also includes determine a method of debugging and for selectively switching between the optimized binary 111 and non-optimized binary 110 during debugging.

In some embodiments, a developer provides or creates an initial binary 109. An optimized binary 111 and a non-optimized binary 110 associated with the binary 109 are then generated. For instance, in some embodiments, the binary 109 is compiled by the compiler 108 to create an optimized binary 111. Additionally, in some embodiments, the compiler 108 may generate a non-optimized binary 110 from the binary 109. In other embodiments, the optimized binary 111 and the non-optimized binary 110 are obtained from a third party. In yet other embodiments, the optimized binary 111 and the non-optimized binary 110 are obtained from a developer application.

Notably, since both the optimized binary 111 and the non-optimized binary 110 are associated with the initial and underlying binary 109, the optimized binary 111 correlates with the non-optimized binary 110. For example, the optimized binary 111 contains optimized functions or references to functions that correspond with or correlate with the non-optimized binary 110 functions.

Binary 109 may also be the same as or different than the actual compiled version of the non-optimized binary 110.

Discussing the functions in the optimized binary 111, a dependency graph 112 is also generated from the binary 109. The dependency graph 112 associates the functions in the optimized binary 111 as well as with functions in the non-optimized binary 110. For example, a function found in the optimized binary 111 may be explicitly or implicitly referenced in another portion of the optimized binary 111 as well as the non-optimized binary 110. The dependency graph 112 maps the references within the optimized binary 111.

The metadata 113 is also generated from the binary 109 by the compiler 108. The metadata 113 includes location identifiers within the optimized binary 111. For example, the identifiers within the metadata 113 identify locations in the optimized binary 111 where the debugger 107 should be redirected to within the non-optimized binary 110 during debugging. In some instances, as will be described in more detail, the metadata can be generated in real-time during the debugging processes, such as when the debugger is directed from the optimized binary 111 to the non-optimized binary after encountering a guard breakpoint within the optimized binary 111.

Once the non-optimized 110 and the optimized binary 111 are obtained, the developer can start the debug process using the debugger 107. In some embodiments, the analysis model 120 analyzes at least one of the binary 109, the optimized binary 111, and/or the non-optimized binary 110 to determine a method of debugging. In some instances, the analysis model 120 determines the binary 109 is debugged by using the optimized binary 111 and selectively redirects the debugger to the non-optimized binary 110. In other instances, the analysis model 120 determines the binary 109 is to be debugged by using the non-optimized binary 110, such as when it is determined too many guard breakpoints would have to be added to the optimized binary 111.

Turning to the debugging process that dynamically redirects between the optimized binary 111 and the non-optimized binary 110, the debugger 107 maps the optimized binary 111 to the non-optimized binary 110 using breakpoints and the dependency graph 112. The debugger 107 also updates mappings in the non-optimized binary 110 to the optimized binary 111 using the metadata 113. Additionally, the debugger 107 dynamically redirects between the optimized binary 111 and the non-optimized binary 110 when triggered.

Figure 2A:
FIGS. 2A through 2C illustrate an example of an optimized binary.
Figure 2B:
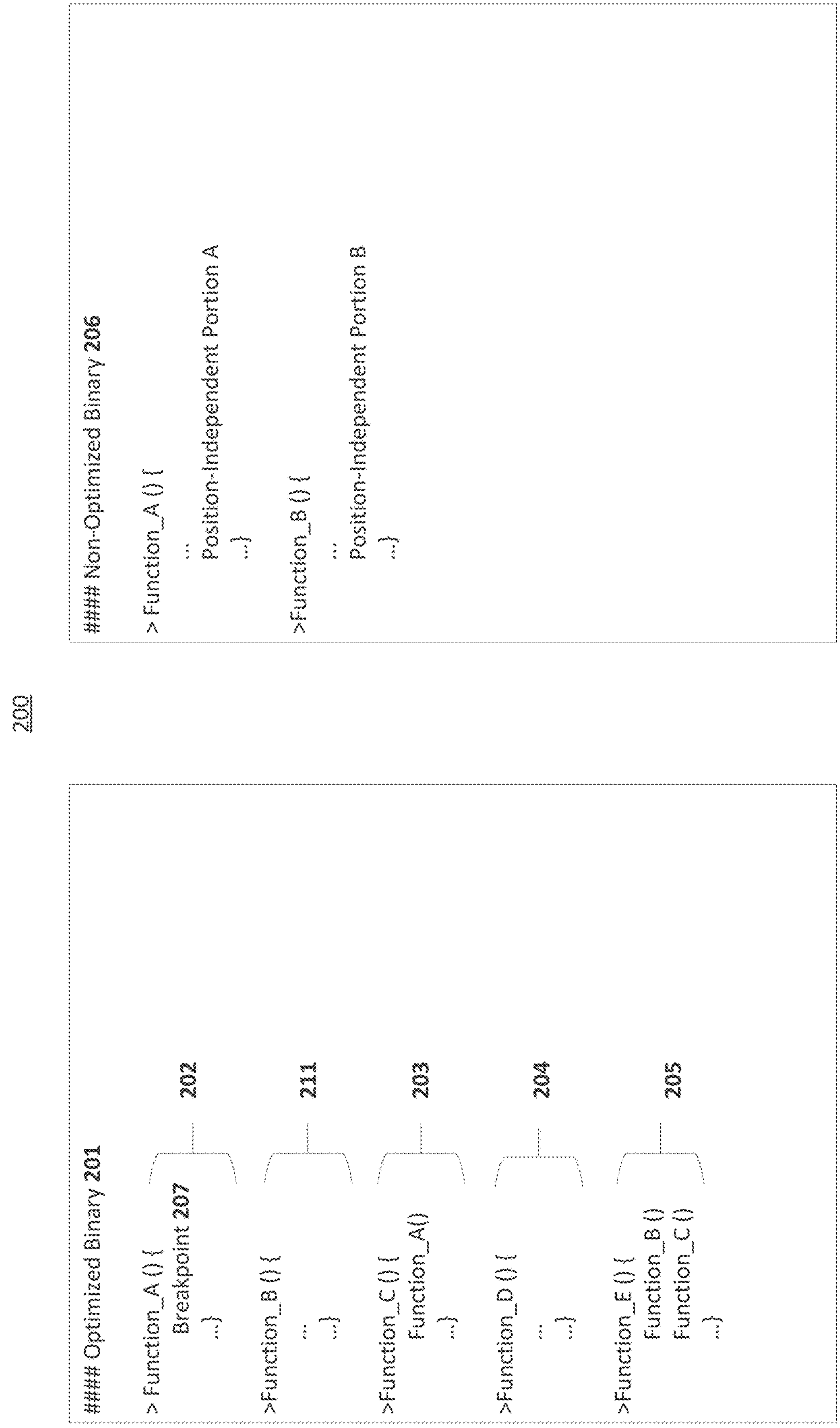
Figure 2C:
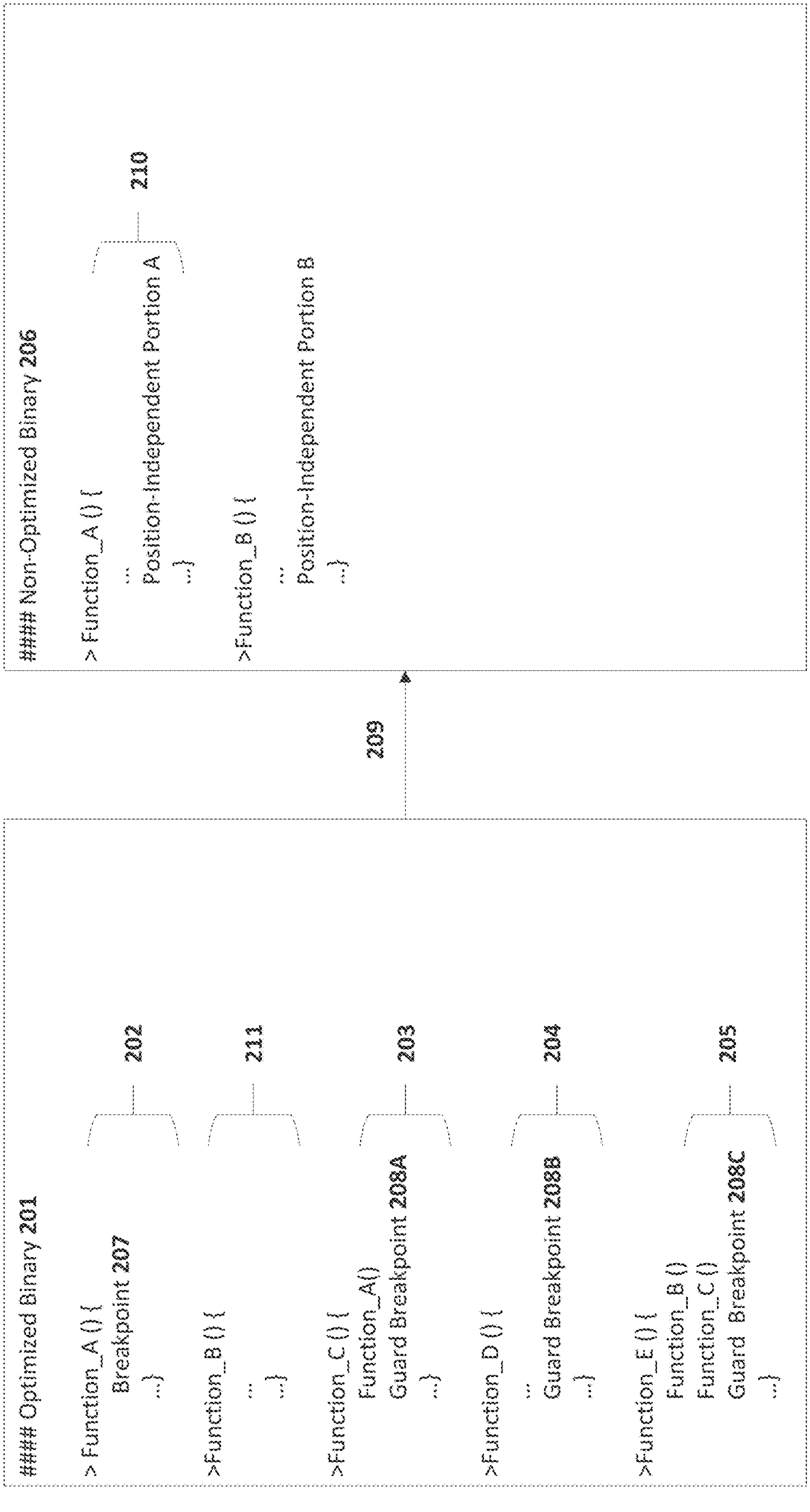

Attention will now be directed to FIGS. 2A through 2C to provide additional details regarding an example 200 of mapping an optimized binary 201 to a non-optimized binary 206.

FIG. 2A shows an optimized binary 201 and a non-optimized binary 206. In some embodiments, the optimized binary 201 and the non-optimized binary 206 are obtained by being compiled by the compiler 108. Additionally, and or alternatively, the binaries may be obtained from a third-party or separate developer application.

As shown, the optimized binary 201 includes a plurality of functions (e.g., Function_A 202, Function_B 211, Function_C 203, Function_D 204, and Function_E 205). As shown, Function_C 203 explicitly references Function_A 202. Function_D 204 implicitly references Function_A 202. Function_E 205 also implicitly references Function_A 202 by explicitly referencing Function_C 203. Function_E 205 also explicitly references Function_B 211.

Discussing in more detail the dependency graph, the dependency graph 112 associates functions within the optimized binary 201. For example, as shown in FIG. 2A, the dependency graph 112 associates Function_C 203, Function_D 204, and Function_E 205 with Function_A 202 since Function_C 203, Function_D 204 and Function_E all reference, either explicitly or implicitly, Function_A 202. As another example, the dependency graph 112, associates Function_E 205 with Function_C 203 and Function_B 211.

Turning to FIG. 2B, once the optimized binary 201 is obtained, a developer may begin the debug process with the debugger 107. During debugging, the developer defines a breakpoint 207. In some embodiments, the developer may define more than one breakpoint 207. In some embodiments, the breakpoint 207 is a trampoline breakpoint. In yet other embodiments, the debugger 107 identifies a breakpoint within the optimized binary 201 based on an analysis performed by the analysis model 120. For example, the analysis model 120 may determine that a breakpoint 207 should be added to Function_A 202 based on performance, location, or references to Function_A 202.

Turning to FIG. 2C, the debugger 107 adds a set of guard breakpoints (e.g., guard breakpoint 208A, guard breakpoint 208B, and guard breakpoint 208C) to the optimized binary 201. The guard breakpoints 208 are added based on the breakpoint 207 and the dependency graph 112. In some embodiments, as shown in FIG. 2C, the guard breakpoints 208 are added to every function associated with the specified function (e.g., Function_A 202) identified by the breakpoint 207 by the dependency graph 112. In other embodiments, the guard breakpoints 208 may be added to a portion of associated functions within the optimized binary 201 (e.g., Function_C 203 and Function_E 205). In these embodiments, the analysis model 120 may determine to add guard breakpoints to the first referenced function (e.g., guard breakpoint 208A), to the first three referenced functions (e.g., guard breakpoints 208A, 208B, 208C), or a random set of referenced functions (e.g., guard breakpoint 208A and guard breakpoint 208C). Thes guard breakpoints 208A, 208B, 208C reference a portion 210 of the non-optimized binary 206 (e.g., portion 210) corresponding to the function that was optimized (e.g., Function_A).

During debugging, the debugger 107 is redirected 209 (see arrow 209) from the optimized binary 201 to portion 210 of the non-optimized binary 206 when the referenced guard breakpoints 208A, 208B, 208C are encountered. After being redirected, the debugger 107 continues execution at portion 210 of the non-optimized binary 206 where the portion 210 of the non-optimized binary 206 includes context information and code associated with Function_A that was omitted from optimized binary 201.

Figure 3A:
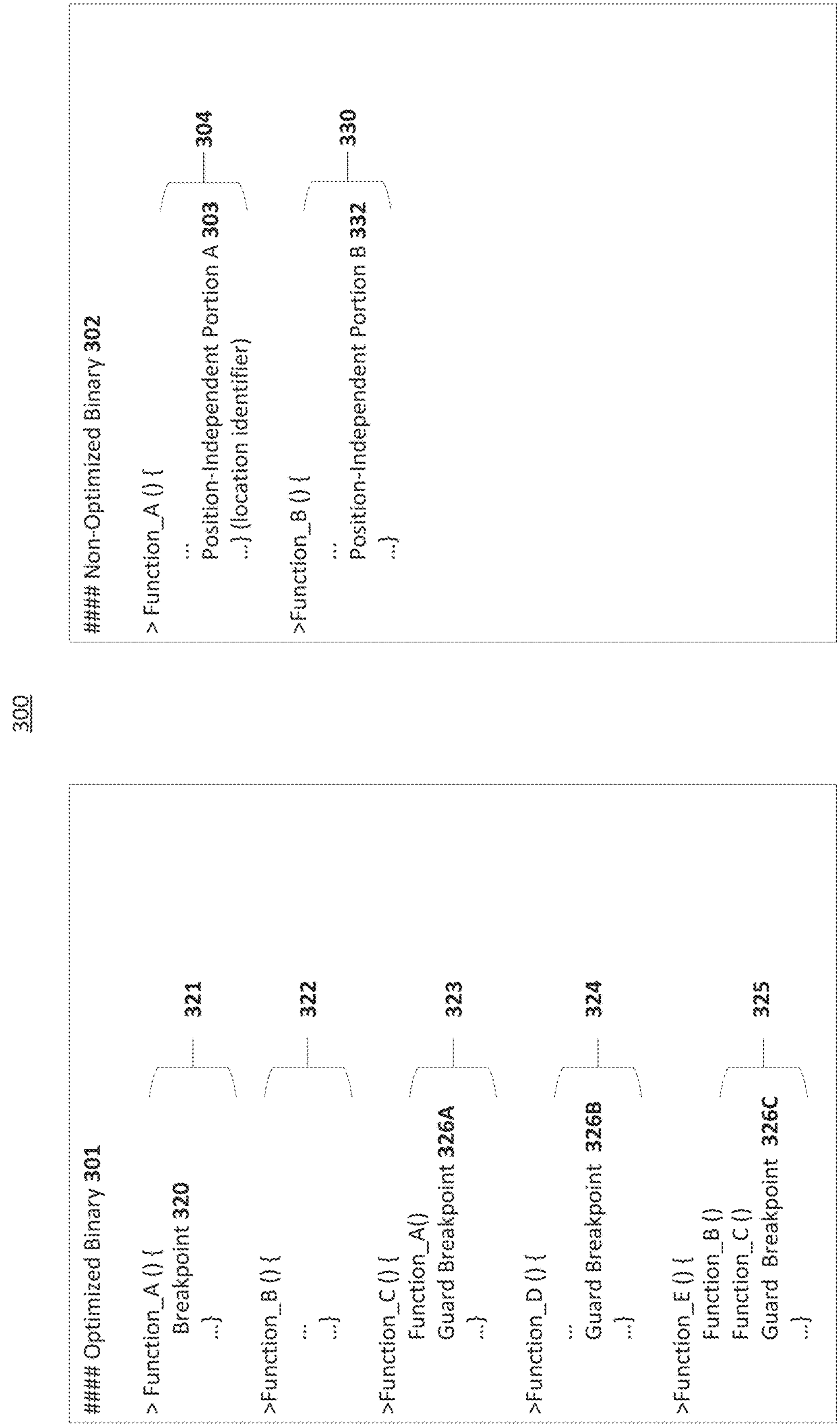
FIGS. 3A and 3B illustrate an example of a non-optimized binary.

Turning now to FIGS. 3A and 3C, the Figures illustrate an example 300 of updating mappings of a non-optimized binary 302 to an optimized binary 301.

FIG. 3A shows an optimized binary 301 and a non-optimized binary 302 that have been obtained. The non-optimized binary 302 includes a plurality of functions (e.g., Function_A 304 and Function_B 303) where each function includes a Position-independent Portion (e.g., Position-independent Portion A 303 and Position-independent Portion B 332) that correspond to functions referenced in the correlating optimized binary 301.

In some embodiments, the non-optimized binary 302 includes all functions found in the optimized binary 301. In other embodiments, only a subset of functions from the optimized binary 301 are included in the non-optimized binary 302.

In some embodiments, during or before the debugging, the debugger 107 identifies the position-independent portion 303 within the non-optimized binary 302 and obtains metadata 113 associated with the optimized binary 301. The metadata 113 includes location identifiers of functions within the optimized binary 301 (e.g., location of Function_A 321), where the debugger should be redirected after processing the corresponding position independent portions of the referenced functions (e.g., position independent portion A 303).

In some embodiments, the location identifier may reference a specific function within the optimized binary 301 (e.g., Function_A 321). In other embodiments, the location identifier may reference a particular point in the optimized binary 301 the debugger was located prior to being redirected during debugging to the non-optimized binary 302 (e.g., Guard Breakpoint 326A in Function_C 323), or the location after the breakpoint 320 where the debugger should continue execution (e.g., the line or function following the breakpoint) upon being redirected.

The location identifier may include a byte range, memory location, or other identifier. The debugger will use this location information, based on metadata 113, when it finishes processing a position independent portion of the non-optimized binary 302 (e.g., position independent portion A 303) that contains the location identifier referenced therein to be redirected back to the optimized binary 310 at the location referenced by the location identifier. Then, after being redirected back to the optimized binary 301 (based on the location identifier), the debugger will continue debugging the optimized binary 310 at the point in the optimized binary 310 corresponding to the location identifier (e.g., subsequent to the referenced breakpoint or guard breakpoint).

Figure 3B:
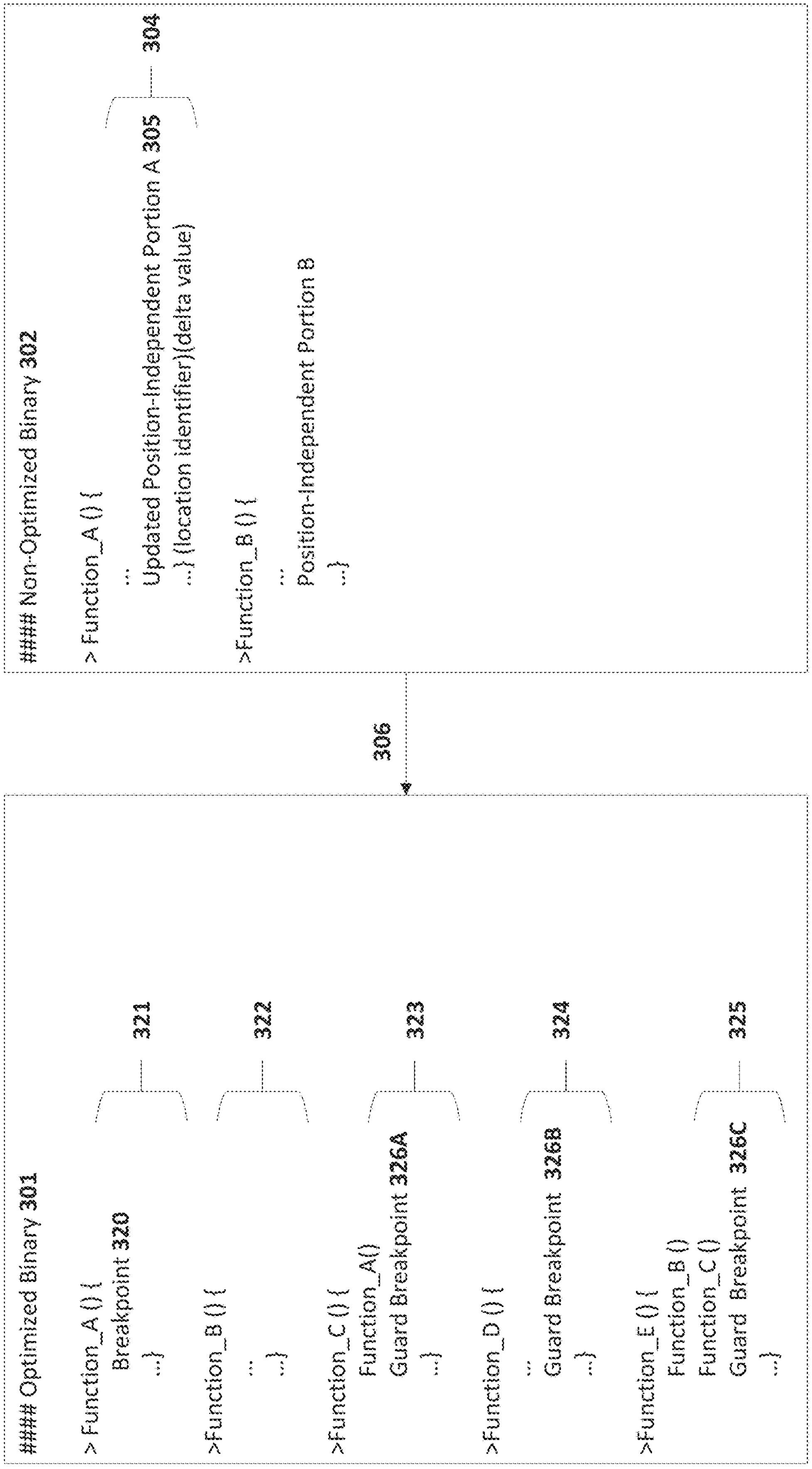

Attention is now directed to FIG. 3B. In this illustration, the system generates an updated position-independent portion 305 based on a delta value that represents a difference between the position-independent portion of the non-optimized binary 302 and the location within the optimized binary 301 that is referenced by the location identifier. The debugger 107 updates the position-independent portion 303 of FIG. 3A with the delta value to generate updated position-independent portion 305 shown in FIG. 3B.

The debugger 107 is redirected (See arrow 306) to the optimized binary 301 from the non-optimized binary 302 based on the updated Position-independent Portion 305, using the location identifier and/or delta value. It will be appreciated that the debugger can be redirected (arrow 306) from the updated position-independent portion 305 where the delta value is encountered to the first instance of the associated function (e.g., breakpoint 320), a random instance of the function (e.g., guard breakpoint 326C), or to the last position the debugger executed within the optimized binary 301 prior to being redirected to the non-optimized binary 302 (e.g., the debugger can use this location information from the optimized binary 301 as the location identifier within the non-optimized binary 302 and/or to generate the aforementioned delta value).

The following discussion now refers to a number of methods (e.g., method 400, method 500, method 600, and method 700) and method acts. Although the method acts are discussed in specific orders or are illustrated in a flow chart as occurring in a particular order, no order is required unless expressly stated or required because an act is dependent on another act being completed prior to the act being performed.

Figure 4:
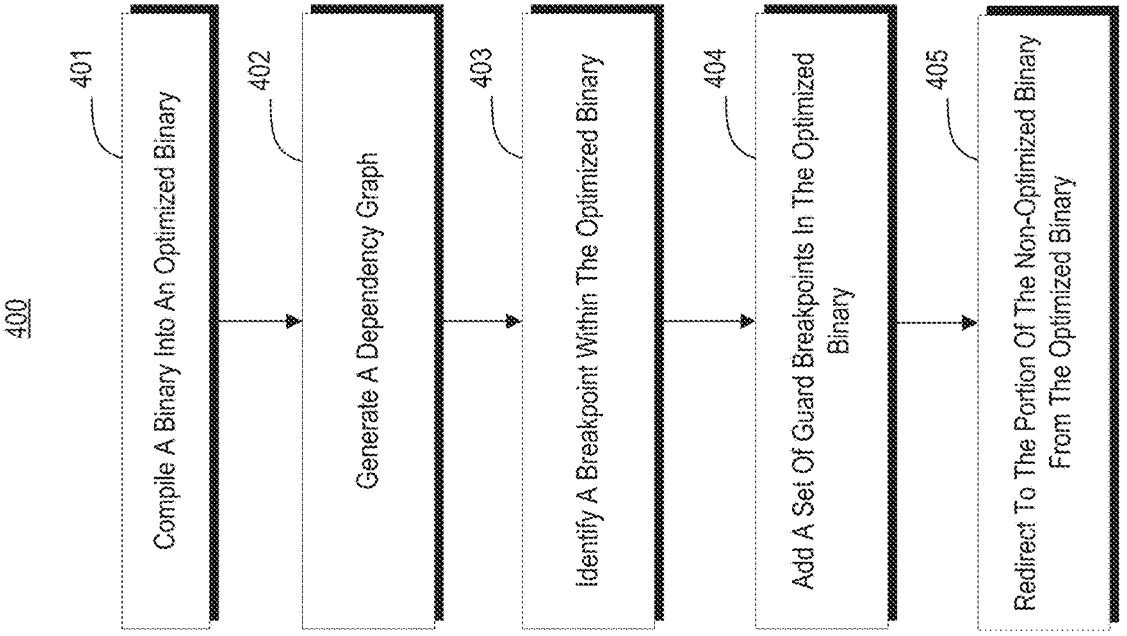
FIG. 4 illustrates a flow chart of an example of a method for mapping an optimized binary to a non-optimized binary.

Embodiments are now described in connection with FIG. 4, which illustrates a flow chart of an example method 400 for mapping an optimized binary to a non-optimized binary. In some embodiments, instructions for implementing method 400 are encoded as computer-executable instructions (e.g., compiler 108 and debugger 107) stored on a computer storage media (e.g., storage media 106) that are executable by a processor (e.g., processor 102) to cause a computer system (e.g., computer system 101) to perform method 400.

Act 401 comprises compiling a binary 109 into an optimized binary 111. The binary 109 is compiled using the compiler 108. In some embodiments, the compiler 108 also generates another non-optimized binary 110 with metadata 113. The metadata 113 identifies location identifiers within the optimized binary 111.

In some embodiments, act 402 comprises generating a dependency graph 112. The dependency graph 112 associates functions within the binary 109. For example, the binary 109 may include references to functions within functions. The dependency graph 112 tracks which functions are associated with other functions. Once the optimized binary 111 is compiled by the compiler 108, the functions within the binary 109 may be implicitly or explicitly referenced. The dependency graph 112 shows the associations between functions even in the instance where the functions are implicitly referenced within the optimized binary 111.

In some embodiments, act 403 comprises identifying a breakpoint within the optimized binary 111. The breakpoint may be placed within a function in the optimized binary 111 by the developer during debugging. In some embodiments, the breakpoint is a trampoline breakpoint. In some embodiments, there may be multiple breakpoints within the optimized binary 111. In some embodiments, the identified breakpoint may be the first breakpoint the debugger 107 encounters. In other embodiments, the developer may specify a breakpoint to be identified.

In some embodiments, act 404 comprises adding a set of guard breakpoints in the optimized binary 111. The guard breakpoints are added in the optimized binary 111 based on the breakpoint and the dependency graph 112. Embodiments use the dependency graph 112 to find a set of functions associated with a specified function with the identified breakpoint. The set of functions associated with the specified function may be implicitly or explicitly referenced in the optimized binary 111.

In some embodiments, the set of guard breakpoints are added to every associated function within the optimized binary 111. In other embodiments, the set of guard breakpoints are added to a portion of associated functions within the optimized binary 111. For example, the set of guard breakpoints may be added to the first function in the dependency graph, a set number of functions in the dependency graph, or a set of random consecutive or non-consecutive functions within the dependency graph 112. The guard breakpoints reference a portion of the non-optimized binary 110 where the debugger can be redirected. In some instances, the portion of the non-optimized binary 110 is associated with a specified function referenced in the optimized binary with the identified breakpoint.

In some embodiments, act 405 comprises redirecting to the portion of the non-optimized binary 110 from the optimized binary 111. The portion of the non-optimized binary 110 includes a function that is associated with the function that includes the guard breakpoint in the optimized binary 111. This allows embodiments to seamlessly and efficiently redirect between the optimized binary 111 and the non-optimized binary 110 during debugging.

In some embodiments, the method further comprises displaying the optimized binary 111 and the non-optimized binary 110 on a user interface. The user interface may be integrated in an integrated development environment running the debugger 107. In some embodiments, the user interface may further give status updates during debugging by the debugger 107, notify the developer of potential issues, and display the debug process showing redirections between the optimized binary 111 and the non-optimized binary 110 as a seamless stream. In some embodiments, the user interface shows the debugged portions of the binary 109 by using a color indicator, a shape indicator, or other indicator to reflect which portions of the binary are optimized and which are non-optimized portions of code. In other embodiments, the user interface simply shows the entire optimized binary and non-optimized binary either separately, concurrently (within different windows), or integrated together with interleaving portions of optimized and non-optimized portions.

Figure 5:
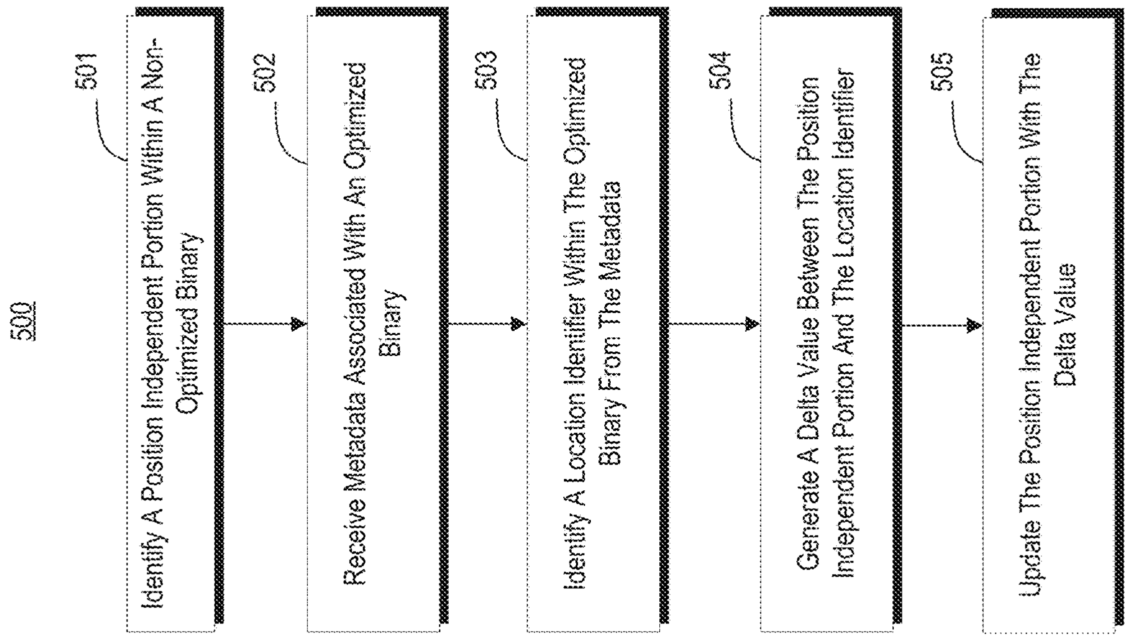
FIG. 5 illustrates a flow chart of an example of a method for updating mappings of a non-optimized binary to an optimized binary.

Embodiments are now described in connection with FIG. 5, which illustrates a flow chart of an example method 500 for updating mappings of a non-optimized binary to an optimized binary. In some embodiments, instructions for implementing method 500 are encoded as computer-executable instructions (e.g., compiler 108 and debugger 107) stored on a computer storage media (e.g., storage media 106) that are executable by a processor (e.g., processor 102) to cause a computer system (e.g., computer system 101) to perform method 500.

In some embodiments, the compiler 108 compiles the non-optimized binary 110 and the optimized binary 111 from the binary 109. Additionally, the compiler 108 generates metadata 113 associated with the binary 109. Act 501 comprises identifying a position-independent portion 303 within a non-optimized binary 110. The position-independent portion 303 includes a code identifier created by the compiler 108 when the non-optimized binary 302 is compiled. In some embodiments, each function within the non-optimized binary 110 may include a unique Position-independent Portion.

In some embodiments, act 502 comprises receiving metadata associated with the optimized binary 111. The metadata 113 is generated by the compiler 108 while compiling the optimized binary 111 and the non-optimized binary 110.

In some embodiments, act 503 comprises identifying a location identifier within the optimized binary 111 from the metadata 113. The metadata 113 includes location identifiers within the optimized binary 111. The location identifiers include location information of certain functions within the optimized binary 111.

In some embodiments, act 504 comprises generating a delta value between the position-independent portion of the non-optimized binary and the corresponding location identifier of the optimized binary. During debugging, the delta value is used to identify a distance value between the current position of the debugger 107 within the non-optimized binary 110 and the position of the corresponding function in the optimized binary 111, for redirecting the debugger 107 to the appropriate portion of the optimized binary 301 (e.g., the portion of the optimized binary 301 identified by the location identifier).

In some embodiments, act 505 comprises updating the position-independent portion with the delta value to facilitate redirecting of the debugger during the debugging processes.

In some embodiments, the method further comprises redirecting the debugger from the non-optimized binary to the optimized binary based on the updated position-independent portion 305. For example, the debugger 107 will read the distance value in the updated position-independent portion 305 in the non-optimized binary 111 and move the debugger 107 forward the distance value to the corresponding position in the optimized binary 110.

In some embodiments, the method further comprises displaying the optimized binary 111 and the non-optimized binary 110 on a user interface. The user interface may be integrated in an integrated development environment running the debugger 107. In some embodiments, the user interface may further give status updates during debugging by the debugger 107, notify the developer of potential issues, and display the debug process showing redirections between the optimized binary 111 and the non-optimized binary 110 as a seamless stream. The user interface may show the debugged portions of the binaries, including the optimized binary 111 and the non-optimized binary 110 concurrently and/or separately, using different formatting to visually distinguish the two types of binaries, as previously described. The binaries may also be shown either separately, concurrently in separate windows, or integrated together into a single window.

Figure 6:
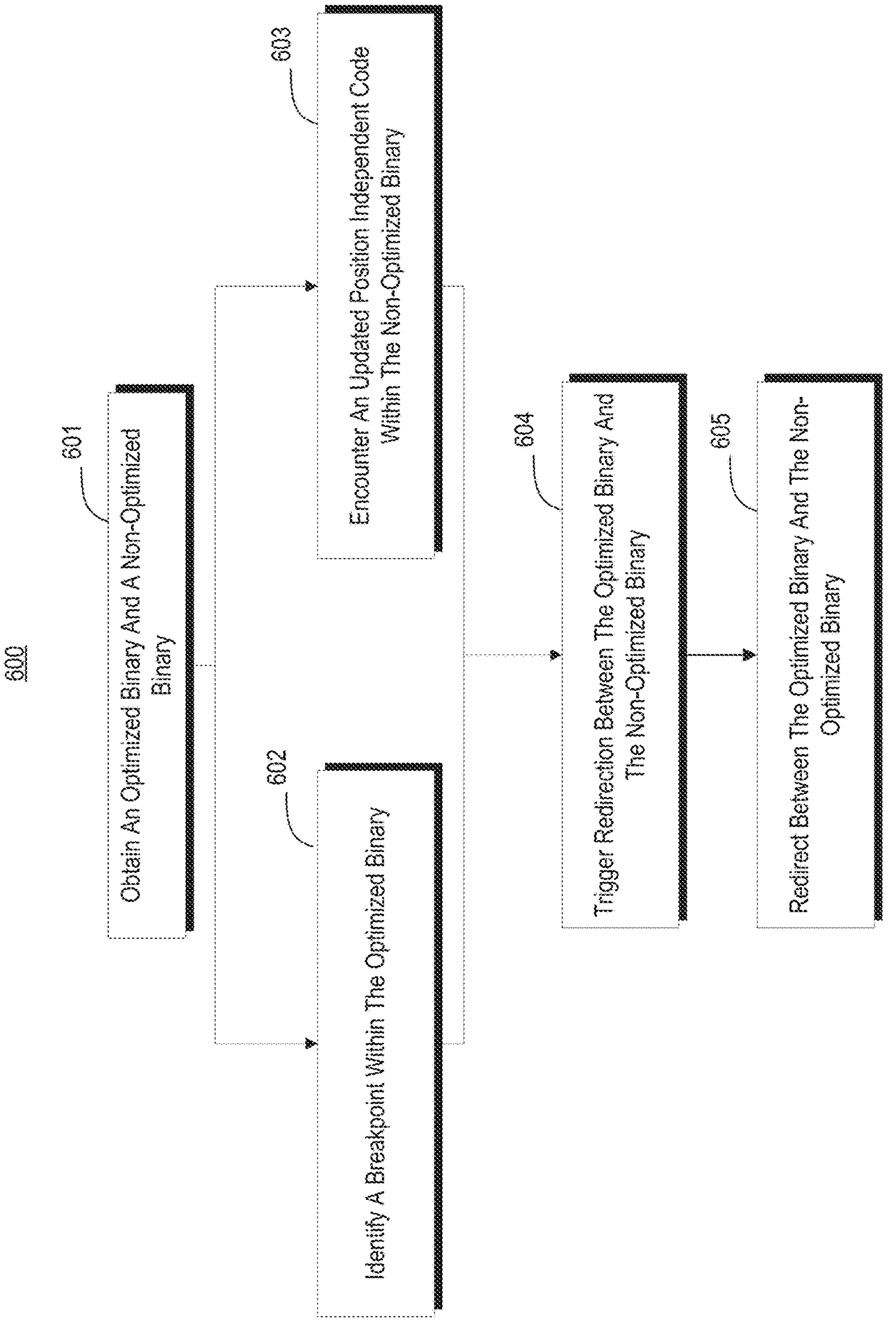
FIG. 6 illustrates a flow chart of an example of a method for dynamic redirection between an optimized binary and a non-optimized binary.

Embodiments are now described in connection with FIG. 6, which illustrates a flow chart of an example method 600 for dynamic redirection between an optimized binary and an optimized binary. In some embodiments, instructions for implementing method 600 are encoded as computer-executable instructions (e.g., compiler 108 and debugger 107) stored on a computer storage media (e.g., storage media 106) that are executable by a processor (e.g., processor 102) to cause a computer system (e.g., computer system 101) to perform method 600.

In some embodiments, act 601 comprises obtaining an optimized binary 111 and a non-optimized binary 110 based on a binary 109. The optimized binary 111 and the non-optimized binary 110 are compiled by the compiler 108 based on the binary 109. Additionally, the compiler 108 generates metadata 113 and a dependency graph 112. In some embodiments, the metadata is associated with the binary 109 including location identifiers in the optimized binary 111. In some embodiments, the dependency graph 112 associated functions within the binary 109.

In some embodiments, act 604 comprises triggering redirection between the optimized binary 111 and the non-optimized binary 110. The trigger may be either act 602, identifying a breakpoint within the optimized binary, or act 603, encountering an updated position-independent portion.

In some embodiments, act 602 comprises identifying a breakpoint within the optimized binary 111. The breakpoint 207 is added manually by a developer during debugging or automatically by the debugger 107. In some embodiments, when a breakpoint is identified, the debugger 107 adds guard breakpoints 208 to functions associated with the breakpoint 207 based on the dependency graph 112.

Alternatively, in some embodiments, act 603 comprises encountering an updated Position-independent Portion within the non-optimized binary 110. When the debugger 107 encounters an updated Position-independent Portion 305 within the non-optimized binary 110, the debugger 107 can read a delta value that identifies difference information regarding the position of the updated position-independent portion 305 and the location of the associated function within the optimized binary 111.

In some embodiments, act 605 comprises redirecting between the optimized binary 111 and the non-optimized binary 110 based on the trigger. In the instance where a breakpoint is identifier (act 602), the debugger 107 is redirected from the optimized binary 111 to the non-optimized binary 110. In the instance where an updated Position-independent Portion is encountered (act 603), the debugger 107 is redirected from the non-optimized binary 110 to the optimized binary 111.

In some embodiments, the method further comprises displaying the optimized binary 111 and the non-optimized binary 110 on a user interface. The user interface may be integrated in an integrated development environment running the debugger 107 as previously described and may be used to display the binaries in any of the manners described above (e.g., with similar or different formatting, independently, concurrently or separately).

In some embodiments, the method further comprises sending a notification when a pre-set time constraint is exceeded. For example, if the debugger 107 has run for a certain amount of time (e.g., 10 seconds, 1 minute, 10 minutes) and has not identified a breakpoint or an updated Position-independent Portion, the debugger 107 may halt execution. This allows embodiments to efficiently use computer resources during the debugging session. In some embodiments, the pre-set time constraint is manually set by the developer or automatically set by the debugger 107.

In some embodiments, the method 600 may be performed automatically. In other words, the method 600 may be performed without requiring user input. For example, once the optimized binary and the non-optimized binary are obtained, a breakpoint is automatically identified or an updated position-independent code is automatically encountered. The identification or encountered portion automatically triggers redirection which can automatically cause the redirection between the optimized binary and the non-optimized binary.

Figure 7:
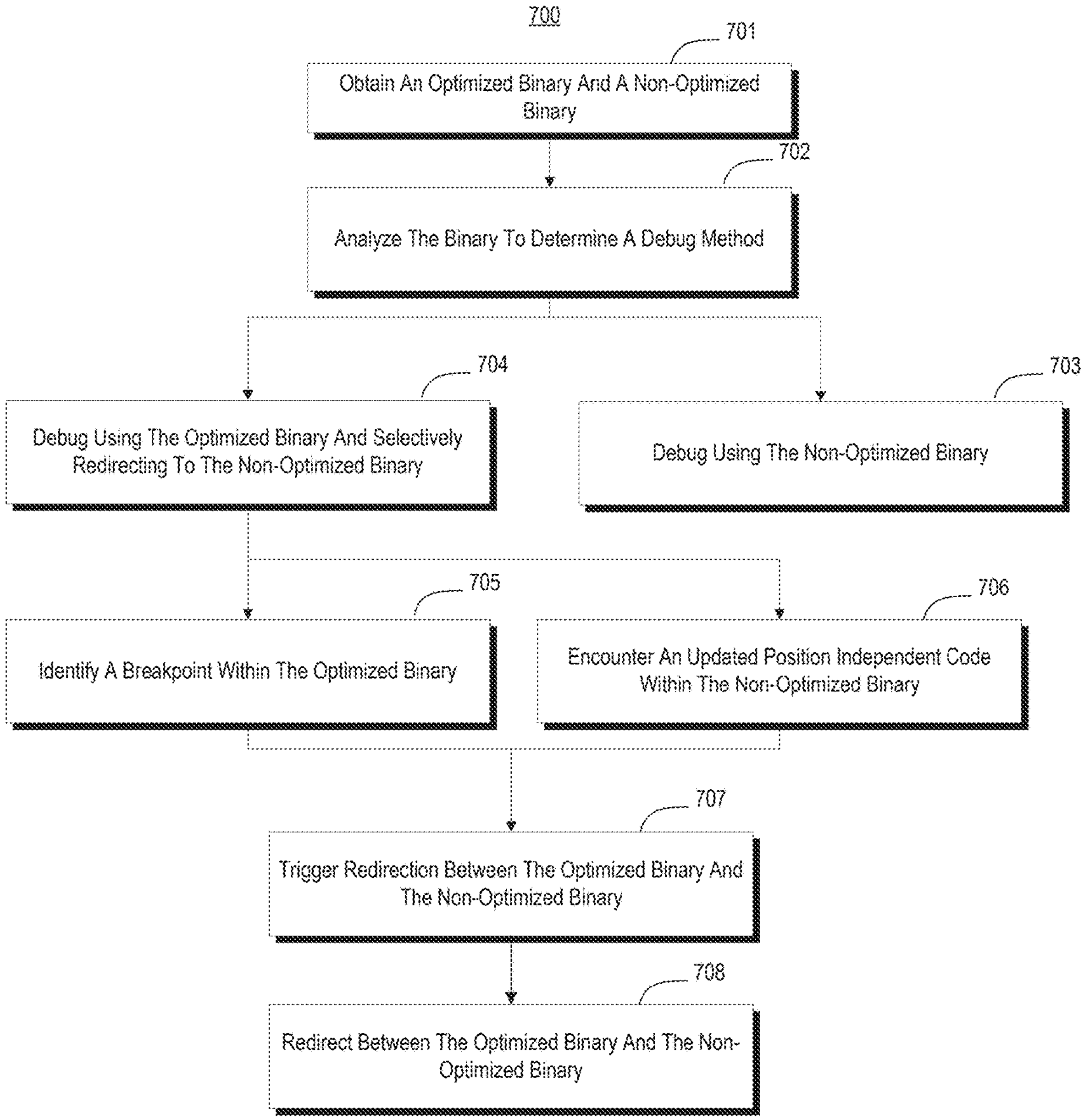
FIG. 7 illustrates a flow chart of an example of a method for dynamic selection of a debug method based on an analysis model.

Embodiments are now described in connection with FIG. 7, which illustrates a flow chart of an example method 700 for determining a debug method based on an analysis model 120. In some embodiments, instructions for implementing method 700 are encoded as computer-executable instructions (e.g., compiler 108, debugger 107, and analysis model 120) stored on a computer storage media (e.g., storage media 106) that are executable by a processor (e.g., processor 102) to cause a computer system (e.g., computer system 101) to perform method 700.

In some embodiments, act 701 comprises obtaining an optimized binary 111 and a non-optimized binary 110. In some embodiments, the dependency graph 112 and metadata 113 are also obtained either through the compiler 108, from a third-party, or a developer application. The dependency graph 112 associates functions within the optimized binary 111 and the metadata 113 identifies location identifiers within the optimized binary 111.

In some embodiments, act 702 comprises analyzing the binary to determine a debug method. In some embodiments, the debugger 107 can determine whether the debug process should be performed using the optimized binary 111 and selectively redirecting to the non-optimized binary (act 704) or using the non-optimized binary (act 703). This determination may be based on user input, such as a selection of one of the options from a presented listing of options.

In other instances, the system automatically determines, without user input, to select one of the options for debugging. By way of example, the system may automatically determine to use only the non-optimized binary during debugging in response to detecting that the system will need to create a significant quantity of guard points for a function where a specified break point may be positioned. If it is determined that this quantity of guard points exceeds a predetermined threshold (e.g., 100, 200, 300 or more), the system will default to using only the non-optimized binary. This will help conserve resources that would otherwise be consumed when redirecting the debugger during debugging operations and it will also be determined to be more efficient than recompiling the optimized code for multiple iterations.

Alternatively, if the system determines (based on the binary analysis) that it can easily generate the optimized and non-optimized binary and that it is unlikely that a significant number of guard points will need to be created, then the system will automatically select the use of both the optimized and non-optimized binaries in the manner previously described.

Following embodiments that debug using the optimized binary 111 and selectively redirecting to the non-optimized binary 110, act 707 comprises triggering redirection between the optimized binary 111 and the non-optimized binary 110. The trigger may be either act 705, identifying a breakpoint within the optimized binary, or act 706, encountering an updated position-independent portion.

In some embodiments, act 705 comprises identifying a breakpoint within the optimized binary 111. The breakpoint 207 is added manually by a developer during debugging or automatically by the debugger 107. In some embodiments, when a breakpoint is identified, the debugger 107 adds guard breakpoints 208 to functions associated with the breakpoint 207 based on the dependency graph 112.

Alternatively, in some embodiments, act 706 comprises encountering an updated Position-independent Portion within the non-optimized binary 110. When the debugger 107 encounters an updated Position-independent Portion 305 within the non-optimized binary 110, the debugger 107 can read a delta value. The delta value includes difference information regarding the position of the updated position-independent portion 305 and the location of the associated function within the optimized binary 111.

In some embodiments, act 708 comprises redirecting between the optimized binary 111 and the non-optimized binary 110 based on the trigger. In the instance where a breakpoint is identifier (act 705), the debugger 107 is redirected from the optimized binary 111 to the non-optimized binary 110. In the instance where an updated Position-independent Portion is encountered (act 706), the debugger 107 is redirected from the non-optimized binary 110 to the optimized binary 111.

These embodiments may also include displaying the optimized binary 111 and the non-optimized binary 110 on a user interface during and/or after the referenced debugging processes, such as previously described.

Some embodiments also include sending a notification when a pre-set time constraint is exceeded. For example, if the debugger 107 has run for a certain amount of time and has not identified a breakpoint or an updated position-independent portion, the debugger 107 may halt execution. This allows embodiments to efficiently use computer resources during the debugging session. In some embodiments, the pre-set time constraint is manually set by the developer or automatically set by the debugger 107.

Embodiments of the disclosure comprise or utilize a special-purpose or general-purpose computer system (e.g., computer system 101) that includes computer hardware, such as, for example, a processor system (e.g., processor system 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media (e.g., storage media 106). Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media include a network and/or data links that carry program code in the form of computer-executable instructions or data structures that are accessible by a general-purpose or special-purpose computer system. A "network" is defined as a data link that enables the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 104) and eventually transferred to computer system RAM and/or less volatile computer storage media at a computer system. Thus, computer storage media can be included in computer system components that also utilize transmission media.

Computer-executable instructions comprise, for example, instructions and data which when executed at a processor system, cause a general-purpose computer system, a special-purpose computer system, or a special-purpose processing device to perform a function or group of functions. In some embodiments, computer-executable instructions comprise binaries, intermediate format instructions (e.g., assembly language), or source code. In some embodiments, a processor system comprises one or more central processing units (CPUs), one or more graphics processing units (GPUs), one or more neural processing units (NPUs), and the like.

In some embodiments, the disclosed systems and methods are practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAS, tablets, pagers, routers, switches, and the like. In some embodiments, the disclosed systems and methods are practiced in distributed system environments where different computer systems, which are linked through a network (e.g., by hardwired data links, wireless data links, or by a combination of hardwired and wireless data links), both perform tasks. As such, in a distributed system environment, a computer system may include a plurality of constituent computer systems. Program modules may be located in local and remote memory storage devices in a distributed system environment.

In some embodiments, the disclosed systems and methods are practiced in a cloud computing environment. In some embodiments, cloud computing environments are distributed, although this is not required. When distributed, cloud computing environments may be distributed internally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as Software as a Service (Saas), Platform as a Service (PaaS), Infrastructure as a Service (IaaS), etc. The cloud computing model may also be deployed using different deployment models such as private cloud, community cloud, public cloud, hybrid cloud, etc.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are only illustrative and not restrictive. All changes that come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A computer-implemented method for updating mappings of a non-optimized binary to an optimized binary, comprising:

during execution of a debugger, compiling the non-optimized binary and the optimized binary;

identifying a position-independent portion within the non-optimized binary;

receiving metadata associated with the optimized binary;

identifying a location identifier within the optimized binary from the metadata;

generating a delta value between the position-independent portion and the location identifier; and updating the position-independent portion with the delta value.

2. The computer-implemented method of claim 1, further comprising compiling the non-optimized binary and the optimized binary from a binary.

3. The computer-implemented method of claim 1, further comprising generating the metadata associated with the optimized binary.

4. The computer-implemented method of claim 1, wherein the position-independent portion includes a location value of the position-independent portion.

5. The computer-implemented method of claim 4, wherein the delta value is a difference between the location identifier and the location value.

6. The computer-implemented method of claim 1, further comprising redirecting from the non-optimized binary to the optimized binary based on the updated position-independent portion.

7. The computer-implemented method of claim 1, further comprising displaying the optimized binary and the non-optimized binary on a user interface.

8. A computer system, comprising:

a processor system; and a computer storage medium that stores computer-executable instructions that are executable by the processor system to perform operations comprising at least:

during execution of a debugger, compiling a non-optimized binary and an optimized binary;

identifying a position-independent portion within the non-optimized binary;

receiving metadata associated with the optimized binary;

identifying a location identifier within the optimized binary from the metadata;

generating a delta value between the position-independent portion and the location identifier; and updating the position-independent portion with the delta value.

9. The computer system of claim 8, wherein the operations further comprise compiling the non-optimized binary and the optimized binary from a binary.

10. The computer system of claim 8, wherein the operations further comprise generating the metadata associated with the optimized binary.

11. The computer system of claim 8, wherein the position-independent portion includes a location value of the position-independent portion.

12. The computer system of claim 11, wherein the delta value is a difference between the location identifier and the location value.

13. The computer system of claim 8, wherein the operations further comprise redirecting from the non-optimized binary to the optimized binary based on the updated position-independent portion.

14. The computer system of claim 12, wherein the operations further comprise displaying the optimized binary and the non-optimized binary on a user interface.

15. A computer-readable hardware storage device that stores computer-executable instructions that are executable by a processor system to update mappings of a non-optimized binary to an optimized binary, the computer-executable instructions including instructions that are executable by the processor system to perform operations comprising at least:

during execution of a debugger, compiling the non-optimized binary and the optimized binary;

identifying a position-independent portion within the non-optimized binary;

receiving metadata associated with the optimized binary;

identifying a location identifier within the optimized binary from the metadata;

generating a delta value between the position-independent portion and the location identifier; and updating the position-independent portion with the delta value.

16. The computer-readable hardware storage device of claim 15, wherein the operations further comprise compiling the non-optimized binary and the optimized binary from a binary.

17. The computer-readable hardware storage device of claim 15, wherein the operations further comprise generating the metadata associated with the optimized binary.

18. The computer-readable hardware storage device of claim 15, wherein the position-independent portion includes a location value of the position-independent portion, wherein the delta value is a difference between the location identifier and the location value.

19. The computer-readable hardware storage device of claim 15, wherein the operations further comprise redirecting from the non-optimized binary to the optimized binary based on the updated position-independent portion.

20. The computer-readable hardware storage device of claim 15, wherein the operations further comprise displaying the optimized binary and the non-optimized binary on a user interface.

* * * * *